United States Patent

Goldstein et al.

[11] Patent Number: 5,726,683
[45] Date of Patent: Mar. 10, 1998

[54] ERGONOMIC COMPUTER MOUSE

[75] Inventors: Mark Goldstein; Elizabeth Cecelia Goldstein, both of Thredbo Village, Australia

[73] Assignee: Midas Mouse International Pty., Sydney, Australia

[21] Appl. No.: 513,105

[22] Filed: Aug. 9, 1995

[51] Int. Cl.⁶ ............................................. G09G 5/08
[52] U.S. Cl. ................................ 345/168; 345/156
[58] Field of Search ............................ 345/163, 156, 345/157

[56] References Cited

U.S. PATENT DOCUMENTS

| | | |
|---|---|---|
| 4,862,165 | 8/1989 | Gart . |
| 5,157,381 | 10/1992 | Cheng . |
| 5,252,970 | 10/1993 | Baronowsky ............... 341/20 |
| 5,260,696 | 11/1993 | Maynard, Jr. . |
| 5,287,090 | 2/1994 | Grant . |
| 5,340,067 | 8/1994 | Martin et al. . |
| 5,355,147 | 10/1994 | Lear . |
| 5,355,148 | 10/1994 | Anderson . |
| 5,414,445 | 5/1995 | Kaneko et al. ............ 345/164 |
| 5,428,368 | 6/1995 | Grant ........................ 345/167 |
| 5,473,344 | 12/1995 | Bacon et al. ............... 345/163 |

FOREIGN PATENT DOCUMENTS

| | | |
|---|---|---|
| 2 698 986 | 6/1994 | France . |
| WO 92/14235 | 8/1992 | WIPO . |
| WO 94/27207 | 11/1994 | WIPO . |

*Primary Examiner*—Regina D. Liang
*Assistant Examiner*—Juliana S. Kim
*Attorney, Agent, or Firm*—Kenyon & Kenyon

[57] ABSTRACT

An improved ergonomic computer mouse is provided. The ergonomic mouse allows for the operator's hand to remain in a relaxed position in as near a state of repose as possible while operating the mouse. The shape of the mouse reduces several of the known high risk postures during mouse use.

22 Claims, 4 Drawing Sheets

ERGONOMIC COMPUTER MOUSE

FIELD OF THE INVENTION

The present invention relates to a pointing device used in conjunction with a personal computer. Particularly this present invention relates to a pointing device conventionally referred to as a mouse.

BACKGROUND OF THE INVENTION

Computers are usually equipped to use a mouse for controlling the movement of the cursor. Computer mice employ mechanical, optical or other means to control the displacement of a cursor on a computer screen. By moving the mouse across a flat surface along two axes, the cursor is proportionally moved across the computer screen. Mouse usage is coming under increasing scrutiny because while providing the computer user with considerable flexibility over the motion of the cursor on the computer screen, extended or repeated use of the mouse can result in severe physical strain. This physical strain develops because, for the hand, even the smallest of postural shifts can increase or decrease stresses on the hand and fingers. Previously, mice were designed without sufficient consideration for the best postures of the fingers wrist and forearm. The reported number of mouse over-use related injuries are increasing and in some industries the injury rates rival and even surpass those of keyboard related injuries. These injuries are collectively referred to as repetitive stress injuries (RSI).

The areas of the body most vulnerable to repetitive stress injuries are the soft tissues of the fingers, wrists and shoulders. More specifically, the index finger and it's knuckle joint, the tendons responsible for extending and flexing the two button fingers (index and middle) and the muscles of the shoulder which abduct, support and are responsible for extension and flexion of the arm during mouse usage. Excessive wrist extension, particularly when associated with radial and ulnar deviation, is also linked to long term tendon and nerve damage. Additionally, current mouse design provides no position for the user to rest the hand without removing the hand from the mouse and the concomitant return of the hand to the mouse. This constant activation of the shoulder muscle and joint is extremely harmful and can lead to long term damage.

Index finger abduction in normal mice results from the combination of several factors. The need to grip the mouse with the ring and little fingers in opposition to the thumb, effectively tethers the ring finger to the side of the mouse. Consequently the movement of the index finger is greatly restricted and forced into a state of continual abduction as a consequence of the linkage to the ring finger. This configuration also forces the thumb and ring and little fingers into constant contraction. Additionally, by necessity, the ring finger is placed on the side of the mouse and can't be moved to what would be a natural position because of the possibility of actuating the right button. This position, causes a myriad of problems including:

a) Restriction of the movement of the index finger to the left button, which necessitates pronation of the entire forearm to accomplish.

b) Restriction of the movement by the fingers and a limitation on the range of fine control. This necessitates a shift of movement activation from the fingers to the wrist and shoulder.

c) The right button position on conventional mice doesn't allow alternative grip positions with the ring finger thereby exacerbating the strain imposed on all fingers.

d) Excessive pronation of the forearm while using conventional mice is almost unavoidable. The low position of left button combined with tethering the ring finger to the right side of the mouse forces excess pronation. Usually, the left button slopes away to the left exacerbating the problems.

e) By providing only one position for thumb placement with no alternative, pronation is necessarily enforced.

The width of the mouse and the placement of the left button exacerbates the problem further by placing stress on the ring finger's joint and its tendons. To worsen the situation, the index and middle fingers are either in constant extension in readiness to actuate the button or levering at the joint to depress the button, thereby forcing the muscles of the two fingers into a state of either constant contraction or constant repetitive motion. This causes stress of the tendons and muscles in the forearm.

There have been several attempts to solve these problems. Mice have been designed with palm knobs and enlarged square ends. These designs, however, aggravate the above identified problems. The thumb and ring finger are brought into constant contraction and require the continual extension of the index and middle fingers over the activating buttons causing stress of the tendons in the forearm. As with other mouse designs, the ring finger is necessarily placed on the side of the mouse, leading to the myriad of problems outlined above. Additionally, pronation of the hand is increased. By elevating the palm, the left stretch of the forefinger is increased and more reach is required thereby necessitating increased pronation. While these designs may provide some hand support, there is no finger extensor relief and they restrict fine finger control.

Alternatively, mice have been designed which support the entire hand, but don't provide the normal detrimental grip. These designs have a variety of shortcomings as well. They take away fine finger control thereby requiring all fine movement to occur at the wrist or shoulder. These pushing, pulling and lateral side-to-side movements are generated at the wrist or shoulder. Continual use of such devices could lead to injuries to these two vulnerable areas. These mice also are difficult or impossible to use in an intermittent fashion due to the necessity of gripping, positioning, removing and returning the operator's hand, and may lead to decreased productivity in some applications.

Lastly, some mice have been designed to have specific hand shaped ergonomics. While these mice provide comfortable positions in which to rest the hand, it is difficult to use these mice in the usual intermittent fashion with just the fingers. The pivot point, or anchor, for mouse designs such as these is no longer the wrist as found in conventional mice, therefore fine control is reduced. This design also shifts much of the fine control initiation to the shoulder, again creating the possibility of long term damage to the shoulder. Such specific hand shaped mice also will not accommodate a variety of hand sizes, necessitating the production and marketing of an excessively large variety of sizes in both left and right hand configurations. These designs generally lack proper surfaces for mouse movement using just the fingers.

SUMMARY OF THE INVENTION

In view of the foregoing disadvantages inherent in the known types of computer mouse apparatus now present in the prior art, the present invention provides an improved ergonomic computer mouse. Neutral hand posture, also known as the position of "repose", is the most relaxed and unstrained position for the hand. In this position, little muscle activity is present in the hand, wrist or forearm. The position of repose for the hand is with fingers slightly cupped and a little splayed, with the thumb forming a "c" shape with the index finger. The amount of pronation varies within individuals but should be in the range of 10° to 45° from the horizontal. This position is easily observed in a weightless environment, for example, while the hand is relaxed and suspended in a bath or swimming pool. Accordingly, the general purpose of the present invention, which will be described subsequently in further detail, is to provide a new and improved ergonomic computer mouse which places the hand in as near a state of repose as possible while manipulating the mouse and both simultaneously improve finger mobility. The shape of the mouse of the present invention reduces several of the known high risk postures during mouse use and allows the continual shifting of postures so as to reduce the effect of continuous repetitive motion due to the unloading of vulnerable muscles, joints and tendon groups. This shape also provides a resting position for the hand, reducing stress in wrist extensors and finger extensors.

The shape of the improved ergonomic mouse of the present invention is such that the pronation of the wrist and hand can be reduced from 0° from the horizontal, wherein the plane defined by the face of the operator's palm is nearly parallel to the surface the mouse is resting upon, to approximately 80° from the horizontal, wherein the same plane is nearly perpendicular to the surface upon which the mouse rests. This shape, which allows the reduction of pronation, also allows the hand, and the entire forearm to rest on the desk surface thereby alleviating the pressure usually exerted on the wrist. Shoulder abduction and contraction of the shoulder muscles are minimized and the forearm muscles responsible for pronation may be relaxed entirely. The shape allows the fingers to curl comfortably and be supported rather than requiring the finger extensors to be held in a constant state of contraction. Thus reducing the tension of the tendons.

This invention is directed to an improved ergonomic mouse. Accordingly, objects of this invention include:

1. providing better, less stressful, finger placement;
2. allowing hand release by providing the ring finger with alternative resting and grasping surfaces while avoiding activation of the right button;
3. allowance for decreased pronation of the wrist and hand;
4. allow greater range of finger movement by releasing the ring finger from the tethered position encountered when using conventional mice;
5. improved design for hand and finger relaxation, control and movement; and
6. allow natural curvature of fingers, thereby reducing or eliminating finger extension stresses.

Additional objects of this invention include providing a mouse that allows resting the operator's hand on its side while using the mouse; providing a pengrip for very fine and relaxed control; providing button positions that allow their activation in line with finger travel; reducing load on the operator's entire limb; providing a correct pivot (anchor) point to control mouse movement; reduction or elimination of the static load on the fore and middle fingers (extensors) normally encountered while using conventional mice; providing a hand position in which the ring finger opposes the thumb muscle (thenar eminence) while allowing for a resting position of the hand on top of the mouse, thereby facilitating relaxation of the wrist extensors and finger extensors while decreasing pronation by approximately 25° and in the range of 20° to 30°.

To achieve these goals the present invention provides an improved computer mouse whose design is ergonomically correct. The mice of the prior art are generally too narrow and necessarily require the thumb, ring and little fingers to hold the mouse while extending the fore and middle (button) fingers in anticipation of actuation. The mouse of the present invention allows a wider, more relaxed grip in the normal mouse position than experienced with prior art mice and provides for an even more relaxed grip in alternative positions made possible by the design of the present invention.

The following description of the improved ergonomic mouse of the present invention relates to a mouse for right handed use. It is understood by the inventors that this invention can be adapted for left handed individuals by making a mirror image of the mouse described herein.

The mouse of the present invention raises and supports the fingers (medial phalanx support) under the index finger joint (knuckle) and slopes away toward the little finger. The mouse of the present invention incorporates two negative slopes over approximately the rear two thirds of the mouse. One slopes the mouse down longitudinally from front to back and the other slopes the mouse laterally from side to side. The negative lateral slope may be from left to right or from right to left depending on whether the mouse is for a left or right handed user. The two negative slopes provide a small rear right corner which allows for a low approach while still supporting the fingers at the proximal phalanges. This low approach combined with the 20° to 30° lateral elevation reduces the stress of supporting the wrist in a position of extension. The negative slope from the left side to the right side also improves the grip and reduces pronation. This support cups the fingers into a naturally unstressed position, a position which is very similar to natural hand posture which is readily observed when resting the forearm on a desk surface. By allowing this shape to be maintained in all grip positions the fingers are allowed to actuate the buttons in a trigger finger action rather than levering the metacarpo-phalangeal joint (knuckle). This is quite different from the usual mouse designs which raise the palm of the hand and force simultaneous extension and contraction of the finger extensors.

The mouse of the present invention incorporates several unique features that aid in reducing the stress of the fingers and wrist. For the thumb there is a contoured smooth surface extending from the forward bottom section of the mouse to the top of the phalanx support. This allows the user to change grips from the normal position or with the hand resting on the mouse to the most comfortable grip wherein the operator's hand is rested on its side (on little finger) and cupping the mouse in a supported resting posture on the desk surface. The mouse or other surface can still be used in the usual manner with the wrist resting on the desk and the fingers achieving the mouse movements. This usage is still better than the normal mouse.

The design of this mouse also allows a fine pinch or pencil grip at the front left corner and left button while in the side rested position. This position also reduces wrist extension and finger extension while relaxing the entire limb and decreasing shoulder abduction.

Other features aiding in stress reduction include: a straight, flattened surface for the ring and little fingers on the right side, opposite the thumb; a section on the front upon which the ring finger can rest and against which the ring finger can push the mouse in against the palm; a smooth rounded palm surface to create a grip triangle with the ring, little finger and the surfaces in contact with the muscles of the thenar and hypothenar eminence to control the mouse within and around the palm of the hand. Also, by allowing the mouse to be gripped between the thumb muscle (thenar eminence) and the ring finger, the thumb and little finger are released from gripping the mouse. Computer mice of the prior art which enforce a hand position requiring the thumb to be in nearly the same plane as the palm of the hand. In stark contrast, the mouse of the present invention separates the thumb from the fingers and allows the thumb to position itself in opposition to the fingers allowing for the relaxation of the thumb flexars and adductors. This results in the "C" formed by the thumb and the forefinger.

The improved ergonomic mouse configuration of the present invention also allows alternative grips, each of which is beneficial to the user in comparison with the grips provided by prior art mice. One position for holding the mouse is the "normal grip", whereby the user approaches the mouse from the top, grasping one side with the thumb in opposition to the ring and little finger grasping the opposite side. Normal button actuation is achieved with the fore and middle fingers. However, as discussed above, the low approach provided by the mouse of the present invention combined with the proximal phalangeal support reduces the stress of supporting the wrist while the stress of constant extension of the button fingers is decreased by the curvature of the front surface. Alternatively, the mouse may be gripped by resting the hand directly on the mouse in a cupped comfortable position. This cupped position allows the hand to rest on the mouse without activating the buttons because the support provided by the phalanx support bears the weight of the fingers and hand rather than the extensor muscles and tendons. This resting position facilitates relaxation of the wrist extensors as well as the finger extensors while reducing pronation of the hand by approximately 20° to 30° in comparison with typical prior art mice.

Some prior art mice have too large a palm knob which requires more reach and greater left stretch of the index finger thereby increasing pronation. Other prior art mice lift the hand so that it is supported by the mouse itself. Either design is potentially injurious as each transfers the origin of all fine movements from the fingers and wrist to the elbow and shoulder. In contrast, the pivot point for mouse control for the mouse of the present invention is either the heel of the hand when the mouse is gripped in the normal position, or the side of the hand when the user's hand is resting on the side. Establishing the pivot point for mouse control at either location benefits the user by eliminating the transfer of fine movements to the shoulder. These design features facilitate the reduction of the load in the entire limb of the operator, thereby minimizing the strain and stress of mouse usage. Additionally, the overall curvature of the mouse is such that the hand grips it in alignment parallel with the cursor movement.

The buttons, of which there can be 1, 2 or three depending on the need of the operator, are positioned such that the ring and middle fingers can press the buttons in all grip positions without lateral movement. The ring finger is also able to rest on a surface next to the right button if so desired. In this position, the ring finger can provide alternative grip, opposing the palm of the hand and also the thenar eminence.

The buttons are positioned to allow easy and perpendicular actuation from all grip positions. The slope of the buttons is shaped so as to allow, a relaxed rather than extended posture. This is accomplished by moving them closer to the ring finger and by having a greater negative slope of the buttons reducing finger extension and allowing a cupping of the hand. Most importantly, releasing the ring finger from its normal position, dramatically reduces stresses on the index finger in abduction and extension normally encountered during mouse use. The release of the ring finger can also bring about a 50 to 100 percent improvement in the range of mouse movement, thus allowing greater fine control of the mouse without transferring the movement to the wrist or shoulder or both.

Reduced static load on the finger buttons is achieved by providing phalanx support and the curved shape of the mouse which allows unstressed cupping of hand rather than the continuous stressful extension of fingers.

An alternative embodiment of the present invention is provided by the inventors. Current computer mice control the cursor in two dimensions only. Defining the X axis as left to right on the screen and the Z axis as up and down on the screen, current mice are limited to controlling the cursor in the XZ plane. By replacing one of the buttons of the mouse described above with a pointing nib or forward/back button the mouse of the present invention is capable of controlling the cursor in three dimensions. While the mouse will control the cursor in the XZ plane as usual, the pointing nib will control the cursor along the Y axis, which is along the longitudinal axis from front to rear of the screen. The planar controls can be designated in any configuration which is desirable. The pointing nib can control the cursor along the Y, X or Z axes, while the cursor's location along the remaining two axes is controlled by the traditional mouse means.

DETAILED DESCRIPTION OF THE INVENTION

With reference now to the drawings and in particular to FIGS. 1-4 thereof, a new and improved ergonomic computer mouse embodying the principles and concepts of the present invention and generally designated by the reference numeral 10 will be described.

Figure 3:
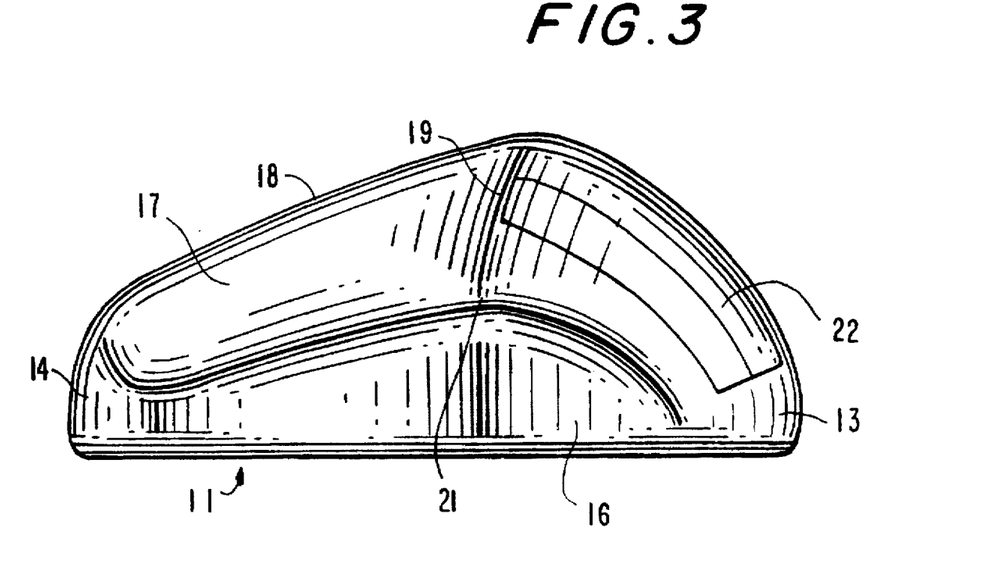
FIG. 3 is a side perspective view of the ergonomic mouse of the present invention.
Figure 4:
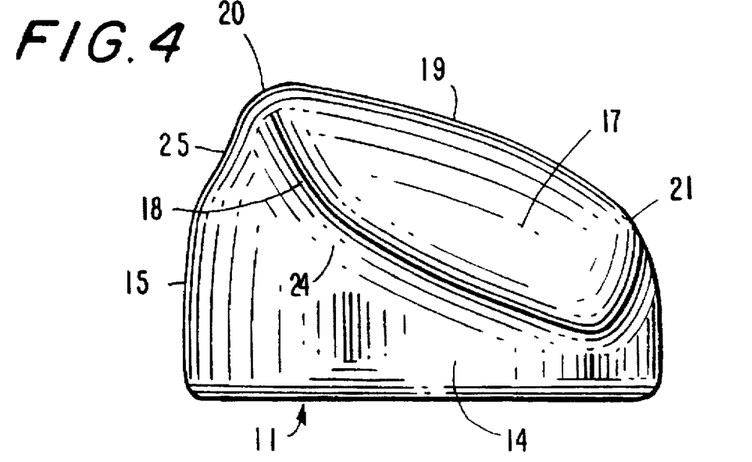
FIG. 4 is a rear perspective view of the ergonomic mouse of the present invention.

The ergonomic computer mouse 10 of the instant invention comprises a planar bottom wall 11 with appropriate openings to accommodate the components of mechanical, optical or other means for controlling the movement of the cursor on the computer screen. A housing 12 extends from the bottom wall 11 approximately orthogonally oriented relative thereto. The housing 12 is defined by a substantially vertically rising front surface 13, a substantially vertically rising rear surface 14 and two substantially vertically and substantially parallel rising side surfaces 15, 16. The side surfaces 15, 16 are joined to opposite lateral sides of the substantially vertically rising front surface 13 at their forward vertical edges. The side surfaces 15, 16 are also joined to opposite lateral sides of the substantially vertically rising rear surface 14 at their rear vertical edge. A top surface 17 is attached along its outer edge to the front 13, rear 14, and sides 15, 16 substantially vertically rising surfaces along their top edge. The top surface 17 as shown in FIG. 4 has a negative slope from left to right when viewed from behind. In addition, the top surface 17 as shown in FIG. 3 has a negative slope from front to rear when viewed from the side.

The mouse of the present invention is of a smooth, curved design. It is therefore understood that the top, side, front and rear surfaces are smoothly joined together. It is therefore further understood that the description of the mouse of the present invention will be best understood to those skilled in the art by reference to the attached figures.

Figure 1:
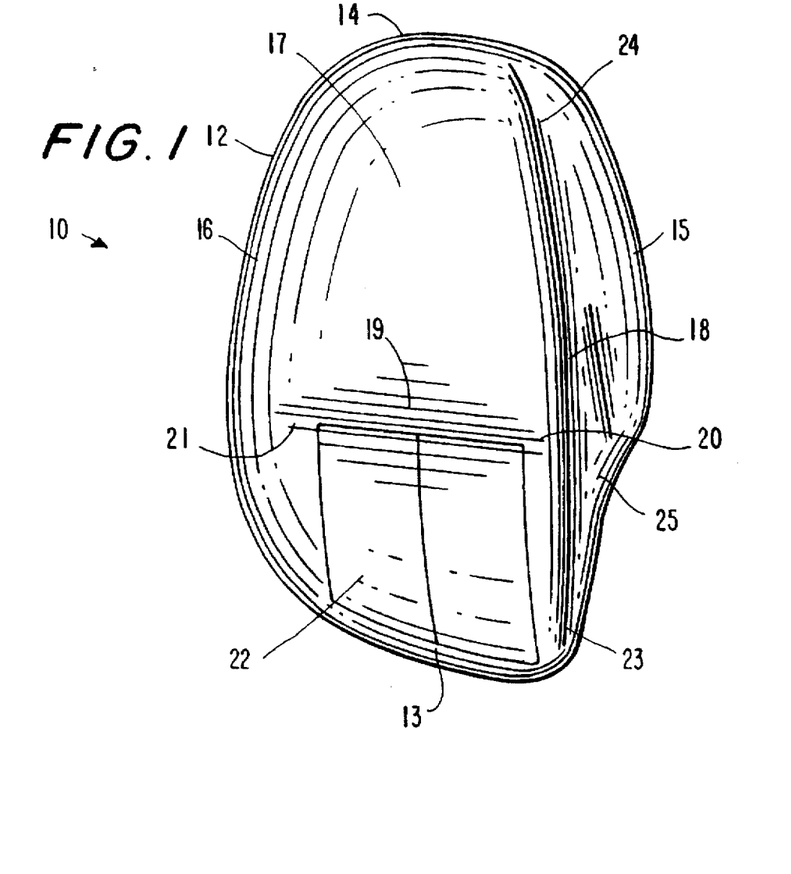
FIG. 1 is top perspective view of the ergonomic mouse of the present invention.
Figure 2:
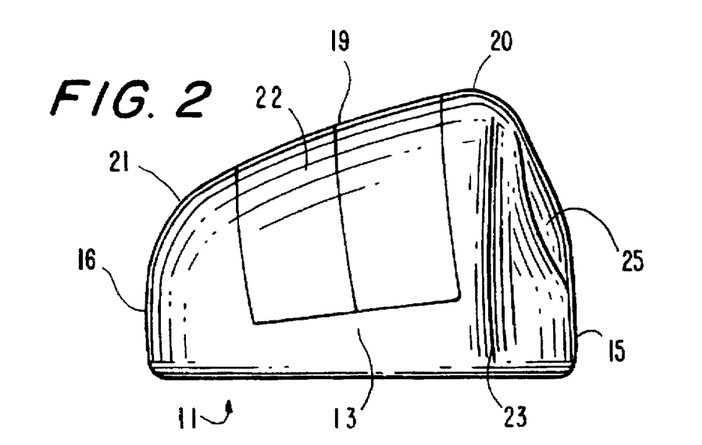
FIG. 2 is a front perspective view of the ergonomic mouse of the present invention.

The overall curvature of the housing 12 is such that the housing fits comfortably in the palm of the hand of the operator while providing a variety of ergonomically advantageous grips. Two of the beneficial ergonomic grips provided by the mouse of the present invention include a normal approach from the top, while grasping one side 15 with the thumb in opposition to the ring and little finger, grasping the opposite side 16 and a grip wherein the operator's hand is resting on the little finger of the hand and cupping the mouse in a supported resting posture. As shown in FIG. 1 there is a peak 18 running from front to back oriented to lie under the operator's thenar eminence providing support thereto and a surface through which the operator can push the mouse with his/her thenar eminence. The peak 18 also provides a continuous surface for the thumb to move the mouse when the operator's hand is resting on its side in the beneficial side grip position. The thumb can be moved from the desk surface up the side surface 15 as the operator's hand is rotated to rest on its side. The peak 18 gives the final purchase for the thumb in this side grip position. As shown in FIGS. 1 and 2 the forward region of side 15 has a recessed region 25 for receiving the operator's thumb. Recessed region 25 is oriented to receive the operator's in both the "normal" over the top grip position and the beneficial side grip position. The recessed region 25 provides a grip surface in both grip orientations and allows the operator's thumb to lie in opposition to the fore and middle fingers thus providing a pencil grip position which is beneficial for fine control of the mouse. As shown in FIGS. 1 and 4, longitudinal peak 18 runs from approximately the juncture 23 of the bottom planar wall 11, the substantially vertical rising left surface 15 and substantially vertically rising front surface 13 up the face of substantially vertically rising front surface 13 and along the length of the mouse to the juncture 24 of the top surface 17, the substantially vertical left surface 15 and substantially vertically rising rear surface 14. When viewed from behind, as in FIG. 4, the negative slope from left to right ranges from 20° to 30°. The angle of this slope is dependant on the respective heights of the substantially parallel lateral sides, 15, 16 and the overall width of the housing 12. When viewed from the side as in FIG. 3, the angle of negative slope from front to rear ranges from 15° to 30° and is dependent upon respective heights of the substantially vertical front surface 13 and substantially vertical rear surface 14 and the overall lengths of the housing 12. As shown in FIGS. 1 and 3, an elongated ridge 19 runs laterally from the juncture 20 of the top surface 17, the substantially vertically rising left surface 15 and substantially vertically rising front surface 13 and runs to the juncture 21 of the top surface 17, the substantially vertically rising right surface 16 and substantially vertically rising front surface 13. The elongated ridge 19 is oriented such that it provides support for the operator's proximal phalanges.

Top surface 17, ridge 18 and ridge 19 form a support surface upon which the operator's hand can rest comfortably on the mouse with 20°–30° reduced pronation, in comparison with conventional mice, to give another ergonomically advantageous grip.

At least one to three buttons, and preferably two buttons 22 are located on the substantially vertical front surface 13. These buttons 22 are extended from substantially near the bottom of the substantially vertical front surface 13 to the front area of the top surface 17. When viewed from the front along the longitudinal axis of the mouse, as in FIG. 2, the buttons 22 are rotated approximately 0° to 30° in a counterclockwise direction. When viewed from the side along the lateral axis of the mouse, as in FIG. 3, the buttons are rotated approximately 20° to 45° in a counterclockwise direction thereby sloping the buttons rearwardly. These angles may vary over the length of the button, increasing or decreasing the slope of the button from one end to the other. This orientation of the buttons allows the buttons to lie under the operator's index and middle fingers when the operator's hand is in approximately the repose position.

In a preferred embodiment of the present invention the dimensions of the mouse are: overall length of the mouse is approximately 90 to 110 mm, width of the mouse is approximately 60 to 80 mm, the maximum height of the substantially vertical left surface is approximately 40 to 52 mm, the height of the substantially vertical right surface is approximately 20 to 33 mm, the height of the substantially vertical rear surface is approximately 14 mm at its minimum to 25 mm at its maximum and the height of the substantially vertical front is approximately 5 mm at its minimum to 52 mm at its maximum. The button surfaces are approximately 42 to 58 mm wide and approximately 36 to 50 mm long with a rearward slope of approximately 20° to 45°. Between the right button and the right edge is approximately 0 and 12 mm of surface area.

In a most preferred embodiment of the present invention the dimensions of the mouse are: overall length of the mouse is approximately 104 mm, width of the mouse is approximately 65 mm, the maximum height of the mouse is approximately 47 mm at the juncture of left surface and the top surface, the height of the substantially vertical right surface is approximately 27 mm, the height of the substantially vertical rear surface is approximately 16 mm and the height of the substantially vertical front surface is approximately 40 mm at the center of the mouse. The button surface is approximately 47 mm wide and approximately 40 mm long with a rearward slope of approximately 30°. Between the center of the right button and the right edge is approximately 7 mm of surface area.

In a second most preferred embodiment of the present invention the dimensions of the mouse are: overall length of the mouse is approximately 105 mm, width of the mouse is approximately 70 mm, the maximum height of the mouse is approximately 48 mm, the height of the substantially vertical right surface is approximately 24 mm, the height of the substantially vertical rear surface is approximately 18 mm and the height of the substantially vertical front surface is approximately 42 mm at the center of the mouse. The button surface is approximately 50 mm wide and approximately 41 mm long with a rearward slope of approximately 40°.

Between the center of the right button and the right edge is approximately 10 mm of surface area.

The above dimensions are measured at the middle of the curve where walls meet. The curves at the junctures of the side walls and the top wall are continuous and therefore the above dimensions are closest approximations.

EXAMPLE

EMG activity level studies were performed to ascertain the efficacy of the ergonomic mouse of the present invention in relieving muscular tension. Muscles of pronation, finger abduction, finger extension and wrist extension were all monitored in mouse holding postures with three prior art mice. These results were compared with readings taken when a mouse of the present invention, as described in the above preferred embodiment, was used. The results are set forth in FIGS. 5–8.

Each of the four mice, three prior art mice and the mouse of the present invention, were tested as follows: Each mouse was tested for the level of EMG activity it caused in the users muscles in each of three positions, normal grip, resting grip and side grip. The level of EMG activity associated with hand pronation (FIG. 5), finger abduction (FIG. 6), finger extension (FIG. 7) and wrist extension (FIG. 8) was measured.

A Thought Technology EMG 201 T with a bandwidth of 25 Hz to 1 KHz was used to make the measurements. The apparatus gives continuous RMS readings. Disposable silver/silver chloride triode electrodes were used.

The muscles which were to be monitored were located by palpation when movement of the appropriate anatomical parts was instigated: Extensor digitorum longus by extending the index and middle fingers; extensor carpi ulnaris by extending the wrist; doral interosseus by abducting the index finger. Where necessary, the skin over the muscle was shaved. The triode electrodes were placed over muscles so that the active and indifferent electrodes were placed directly over and in line with the longitudinal axis of the muscle. For the pronator quadratus, the active electrodes were placed transversely across the wrist. Conductive gel was applied to the electrodes to ensure low resistance.

To obtain the static EMG reading rather than the dynamic, 4 seconds were allowed to elapse after placement of the hand on each of the mice and then the reading taken.

The subject was required to grip the four mice in random order for each of the three grips and the four muscles. Five readings were taken and averaged to construct the bar graphs.

Figure 5:
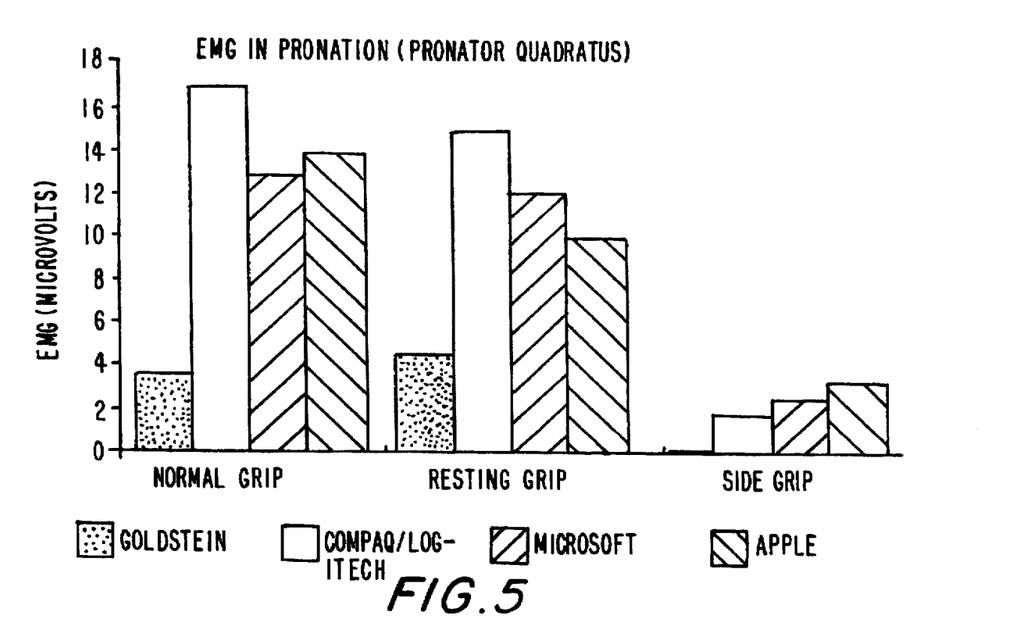
FIG. 5 is a bar graph showing comparing EMG readings associated with pronation during use of three prior art mice and the mouse of the present invention.
Figure 6:
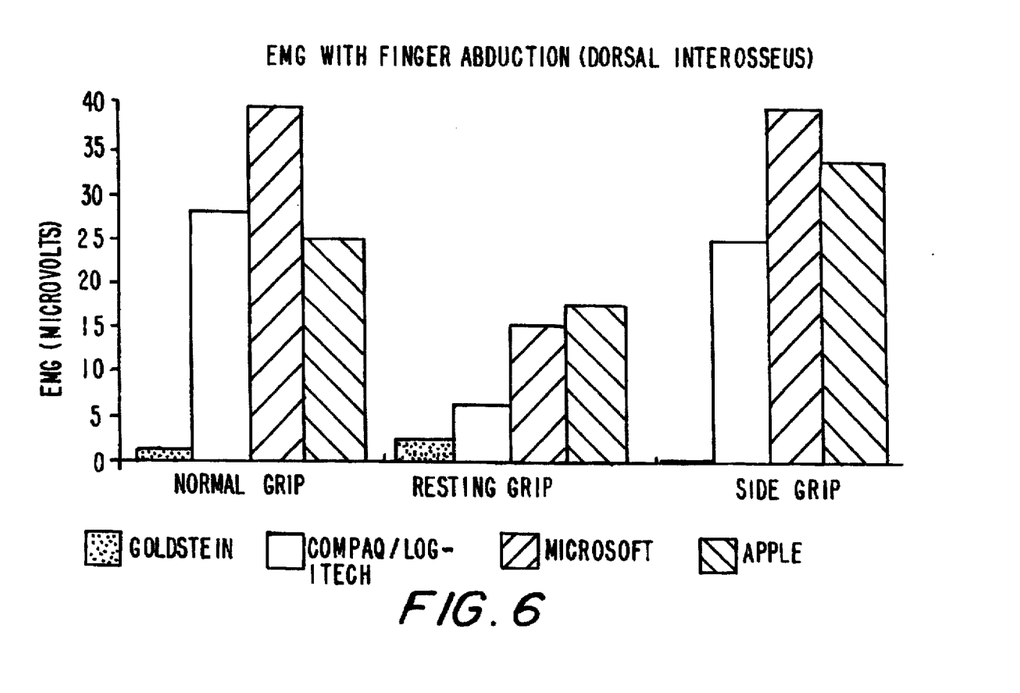
FIG. 6 is a bar graph showing comparing EMG readings associated with finger abduction during use of three prior art mice and the mouse of the present invention.
Figure 7:
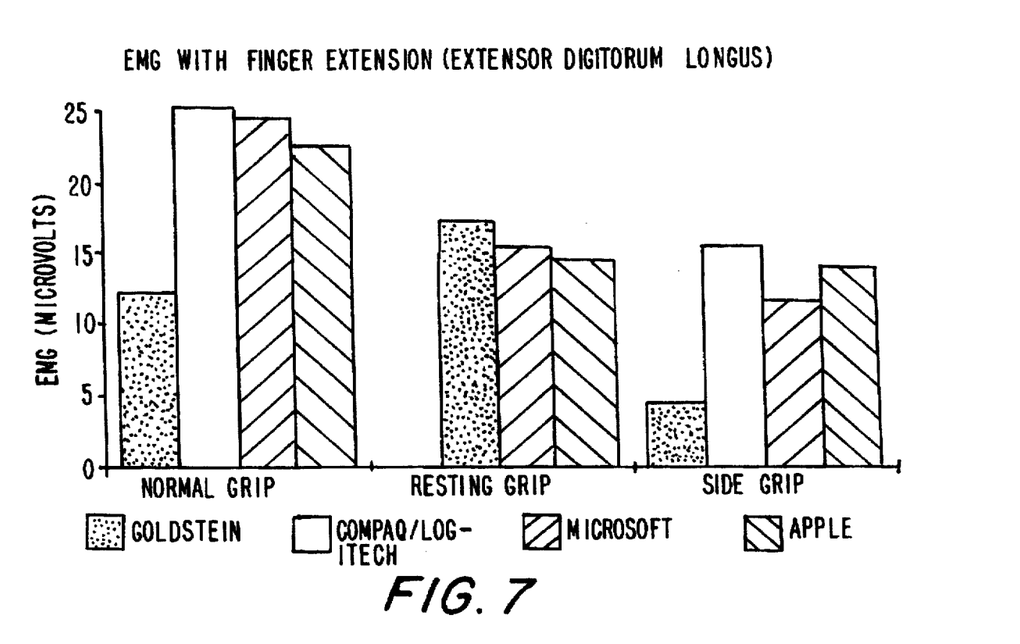
FIG. 7 is a bar graph showing comparing EMG readings associated with finger extension during use of three prior art mice and the mouse of the present invention.
Figure 8:
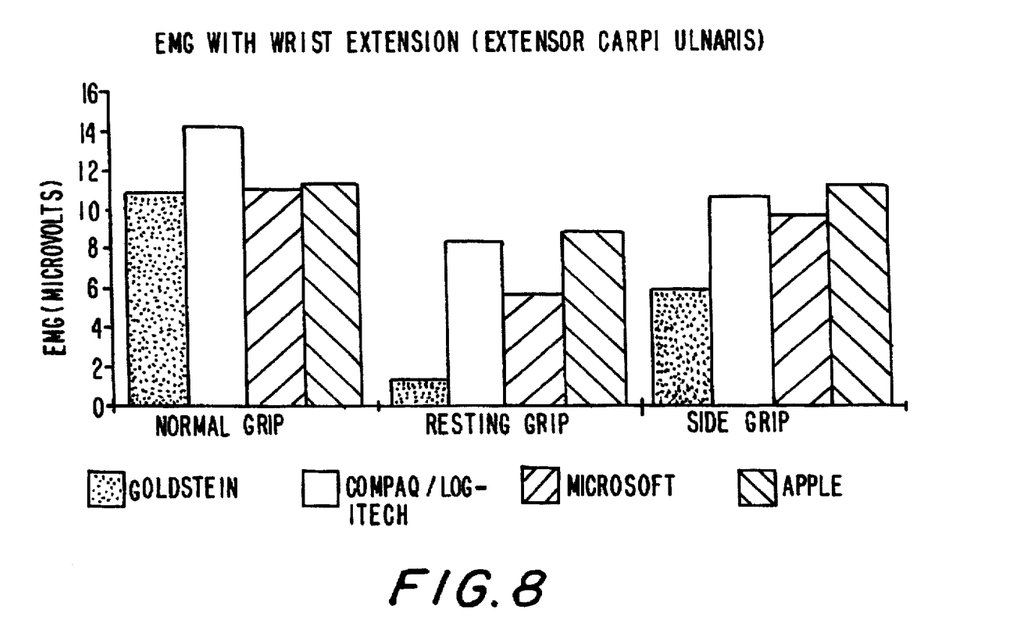
FIG. 8 is a bar graph showing comparing EMG readings associated with wrist extension during use of three prior art mice and the mouse of the present invention.

The accompanying histograms dramatically illustrate the effectiveness of the mouse of the present invention in alleviating the stresses inherent in the shapes of the other prior art mice tested. In the normal grip position, wherein the operator's hand approaches the mouse over the top and moves the mouse with the fingers, the mouse of the present invention reduced stresses by factors ranging from 2 to 20 fold as shown in FIGS. 5, 6 and 7. The EMG levels for wrist extension, FIG. 8, in the normal grip position was not significantly different from the other mice.

The mouse of the present invention showed very large improvements in all muscles tested when the resting grip position was tested. Reductions in EMG activity ranged from 2 fold to over 150 fold as shown by the resting grip histograms in FIGS. 5–8.

The mouse of the present invention was specifically designed to allow continuous pronation relief with the resting grip position and particularly the side grip position. The other mice are not designed to allow for the side grip position, however, with some effort this grip position can be achieved with the prior art mice. For uniformity of the experiment the side grip position was utilized when the EMG measurements were made to ascertain the position's effectiveness in relieving stress. As expected, the mouse of the present invention improves the pronation and finger abduction EMG readings in this position as shown in the side grip histograms in FIGS. 5–8. Although, finger and wrist extension EMG readings for the mouse of the present invention did not show as great a reduction, FIGS. 7 and 8, over the prior art mice as were seen with the resting grip, the results were still superior to all the tested prior art mice. The 3 prior art mice tested all showed decreased EMG activity levels when the side grip position was used, validating the necessity for the positions use. However, these prior art mice can not be easily used in this position and would possibly generate other unwanted postural and biomechanical stresses as a result of their inappropriate shapes.

In summary, the mouse of the present invention achieves the design criteria by: reducing the level of measured muscle EMG by up to 150 fold; allowing the shifting of static load away from fatigued muscles; improving the range of finger motion; and permitting relaxation of the entire upper limb, from the fingers to the shoulder.

What is claimed is:

1. An ergonomic computer mouse for inputting commands into a computer, comprising:

a housing comprising a bottom wall, a top surface, a front surface, a right side surface and a substantially vertically rising left side surface, said top surface having a negative slope from front to rear in a range of 15 degrees to 30 degrees and from left to right in a range of 20 degrees to 30 degrees and providing at the front of the top surface a phalanx support; and a plurality of rectangular buttons for inputting commands into the computer, said plurality of buttons curving from the front of the top surface to the top of the front surface and rotated in a counterclockwise position when viewed from the front of the computer mouse along the longitudinal axis.

2. A computer mouse for use on a desk and having a plurality of ergonomically correct holding grips, comprising:

a bottom wall having an opening to accommodate means for controlling a computer;

a housing, coupled to the bottom wall, comprising a top surface, a front surface, a right side surface and a substantially vertically rising left side surface, said top surface having a negative slope from front to rear and from left to right and providing at the front of the top surface a phalanx support and providing at the rear of the top surface a palm rest serving as a butting surface;

said left side surface including a contoured recessed region adjacent to the left edge of the phalanx support;

one or more curved buttons curving from the front of the top surface to the top of the front surface;

said right side surface continuing to a flattened surface adjacent to said one or more buttons;

the computer mouse capable of being held in a grasping grip, a resting position and side grip;

wherein, when said computer mouse is held in the grasping grip such that a user's hand is arched over the computer mouse such that the user's ring finger receives support from the flattened surface and is used in combination with the user's thumb to control positioning of the computer mouse while avoiding activation of the one or more buttons, the user's thumb positionable on and supported by the contoured recessed surface, the user's index and middle fingers curled over and supported by the phalanx support and the one or more buttons thereby reducing finger extension and used to operate the one or more buttons in line with finger travel without lateral movement of said fingers, and the heel of the user's hand receives support from the desk;

wherein, when said computer mouse is held in the resting position such that the user's hand rests upon and receives support from the computer mouse, the user's palm rests on the top surface and the user's fingers are curled, the user's ring finger receives support from the flattened surface and is used to control positioning of the computer mouse, the user's thumb resting on the contoured recessed surface, the user's index and middle fingers curled over and supported by the phalanx support and the one or more buttons and used to operate the one or more buttons in line with finger travel without lateral movement of said fingers, the user's palm resting on the palm rest, and wherein, when the computer mouse is held in the side grip position, the user's hand and arm rests upon the desk, the left to right negative slope providing access to the computer mouse without interfering with thumb and finger manipulation such that the user's thumb is resting on the contoured recessed surface and used to assist in positioning of the computer mouse and the user's index and middle fingers are curled over and supported by the phalanx support and the one or more buttons and used to operate the one or more buttons in line with finger travel without need for lateral movement of said fingers.

3. The computer mouse of claim 2 wherein the user's ring finger remains substantially in its position of repose thereby allowing rotation of the hand along the longitudinal axis of the hand.

4. The computer mouse of claim 2 wherein the right wall is curved to allow, when the computer mouse is held in the side grip, the user's hand to cup the mouse while in a position of repose.

5. The computer mouse of claim 2 wherein the buttons are diagonally offset in a clockwise direction when viewed from the rear of the mouse.

6. A computer mouse for use on a flat surface, comprising:
a bottom wall having an opening to accommodate means for controlling movement of a computer cursor in an XZ plane;
a housing, coupled to the bottom wall, comprising a top surface, a front surface, a right side surface and a substantially vertically rising left side surface, said top surface having negative slopes from front to rear and from left to right;
one or more buttons curved from the front of the top surface to the top of the front surface; and
means for controlling movement of the computer cursor in a Y plane.

7. The computer mouse of claim 6 wherein the means for controlling movement of the computer cursor in the Y plane further comprises a forward/back button.

8. The computer mouse of claim 6 further comprising means for supporting and allowing curling of the user's fingers thereby reducing tension of tendons.

9. The computer mouse of claim 8 further comprising means for perpendicular activation of the one or more buttons by movement of the user's fingers in line with finger travel without lateral movement.

10. The computer mouse of claim 6 further comprising means for gripping the computer mouse in three ergonomic positions.

11. A computer mouse pointing device for use by a user comprising:
a bottom wall having an opening to accommodate means for controlling a computer;
a housing, coupled to the bottom wall, comprising a top surface, a front surface, a right side surface and a substantially vertically rising left side surface, said top surface having a negative slope from front to rear and from left to right and providing at the front of the top surface a lateral phalanx support and providing on the left side of the top surface a longitudinal peak for support of the user's thenar eminence and providing at the rear of the top surface a palm rest serving as a butting surface;
said left side surface including a contoured recessed region adjacent to the left edge of the phalanx support;
one or more curved buttons curving and diagonally offset from the front surface to the top surface;
said right side surface continuing to a flattened surface adjacent to said one or more buttons;
the computer mouse capable of being held in a side grip;
wherein, when the computer mouse is held in the side grip position, the user's hand and arm rests upon the desk, the negative slopes providing access to the computer mouse without interfering with thumb and finger manipulation such that the user's thumb is resting on the contoured recessed surface, the face of the user's ring finger is in contact with the flattened surface and in opposition to the face of the user's thumb and used to assist in positioning of the computer mouse and the user's index and middle fingers are curled over and supported by the phalanx support thereby minimizing finger extension and used to operate the one or more buttons in line with finger travel without need for lateral movement of said fingers.

12. The computer mouse pointing device of claim 11 wherein the user's ring finger and little finger are positioned substantially as they are in repose.

13. The computer mouse pointing device of claim 11 wherein the user's ring finger and little finger are not laterally displaced from their natural position in repose.

14. The computer mouse pointing device of claim 11 wherein the direction of force applied by the user's thumb to the mouse is substantially perpendicular to the line of travel of the first and middle fingers when activating the buttons.

15. The computer mouse pointing device of claim 11 wherein the heel of the user's hand is in contact with the butting surface.

16. The computer mouse pointing device of claim 11 wherein the diagonal offset of the buttons is in a clockwise direction when viewed from the rear of the mouse.

17. The computer mouse pointing device of claim 11 wherein the user's ring finger remains substantially in its position of repose thereby allowing rotation of the hand along the longitudinal axis of the hand.

18. A computer mouse for use on a desk, comprising:
a bottom wall having an opening to accommodate means for controlling a computer;
a housing, coupled to the bottom wall, comprising a top surface, a front surface, a right side surface and a substantially vertically rising left side surface, said top surface having a negative slope from left to right for pronation relief and providing at the front of the top surface a phalanx support to assist finger support and reduce wrist extensor tension and providing at the rear of the top surface a palm rest;

one or more curved buttons at the front of the mouse;

said right side surface continuing to a flattened surface adjacent to said one or more buttons; and wherein, said computer mouse is held such that the user's ring finger receives support from the flattened surface and the user's index and middle fingers curled over and supported by the phalanx support and the one or more buttons thereby reducing finger extension and used to operate the one or more buttons in line with finger travel without lateral movement of said fingers, and the heel of the user's hand rests and pivots on the desk.

19. The computer mouse of claim 18 wherein the top surface further comprises a negative slope from front to rear to allow the mouse to be used by different hand sizes.

20. The computer mouse of claim 18 wherein the right side surface is curved to permit the user to rest the hand on the side of the desk and grip the computer mouse, the curved right side surface permitting comfortable cupping of a user's hand whilst resting on the desk.

21. The computer mouse of claim 18 wherein the one or more buttons are elongated and wherein the one or more buttons curve from the front of the top surface to the top of the front surface.

22. A computer mouse controlled by a hand of a user, the computer mouse including a plurality of buttons and movable across a flat surface to control operation of a computer, comprising:

means for supporting the hand in a state of repose while manipulating the computer mouse;

means for reducing stress in wrist extensors and finger extensors while manipulating the computer mouse;

means for supporting, raising and allowing curling of the user's fingers thereby reducing tension of tendons;

means for activation of said plurality of buttons by movement substantially perpendicular to the plane of the buttons of the user's fingers said movement in line with finger travel without lateral movement; and means for allowing the heel of the hand to rest and pivot on the desk.

* * * * *